United States Patent [19]

Minardi

[11] Patent Number: 5,005,903
[45] Date of Patent: Apr. 9, 1991

[54] PROTECTIVE CUSHION FOR CHILD'S AUTO SEAT

[76] Inventor: Raye E. Minardi, 19601 Gunn Hwy., Odessa, Fla. 33556

[21] Appl. No.: 347,570

[22] Filed: May 5, 1989

[51] Int. Cl.⁵ .............................................. A47C 27/00
[52] U.S. Cl. .................................... 297/250; 297/218; 297/219
[58] Field of Search ............... 297/250, 464, 460, 218, 297/219; 5/448, 436, 431; 248/346.1

[56] References Cited

U.S. PATENT DOCUMENTS

| | | | |
|---|---|---|---|
| 3,884,495 | 5/1975 | Petock | 248/345.1 |
| 4,234,228 | 11/1980 | Flamm | 297/464 |
| 4,383,713 | 5/1983 | Roston | 5/434 X |
| 4,436,341 | 3/1984 | Converse | 297/250 |
| 4,531,247 | 7/1985 | Eary, Sr. | 5/434 X |
| 4,695,092 | 9/1987 | Hittie | 297/250 |
| 4,712,258 | 12/1987 | Eves | 5/424 |
| 4,738,489 | 4/1988 | Wise et al. | 297/250 X |
| 4,754,999 | 7/1988 | Kain | 297/250 |
| 4,773,702 | 9/1988 | Takahashi et al. | 297/218 |
| 4,775,183 | 10/1988 | Tsunge et al. | 297/219 |
| 4,779,930 | 10/1988 | Rosen | 297/460 X |
| 4,807,936 | 2/1989 | Behrendt | 248/345.1 |
| 4,813,745 | 3/1989 | Woody | 297/464 |
| 4,817,902 | 4/1989 | Mason | 248/345.1 |
| 4,852,894 | 8/1989 | Dyer | 297/250 X |

Primary Examiner—Jose V. Chen
Attorney, Agent, or Firm—Pettis & McDonald

[57] ABSTRACT

A protective cushion for a child's auto seat comprising a cover, padding encased by the cover and structure for removably attaching the cushion to the exterior of a child's auto seat, whereby persons or things seated or placed next to a child's auto seat, whether occupied or not, will be protected from injury or discomfort from the hard, angular or rough surfaces of the exterior of the auto seat.

12 Claims, 2 Drawing Sheets

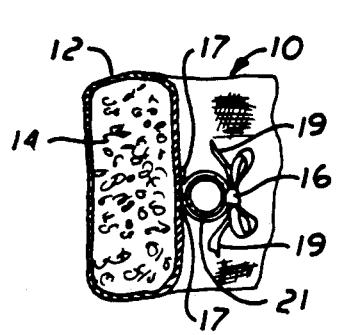
FIG. 4
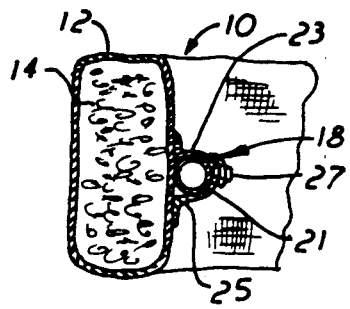
FIG. 5
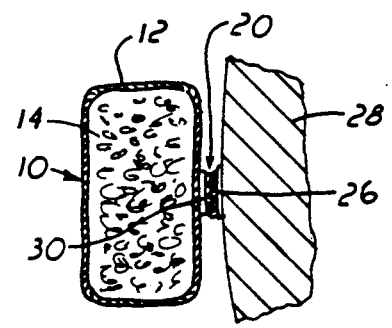
FIG. 6
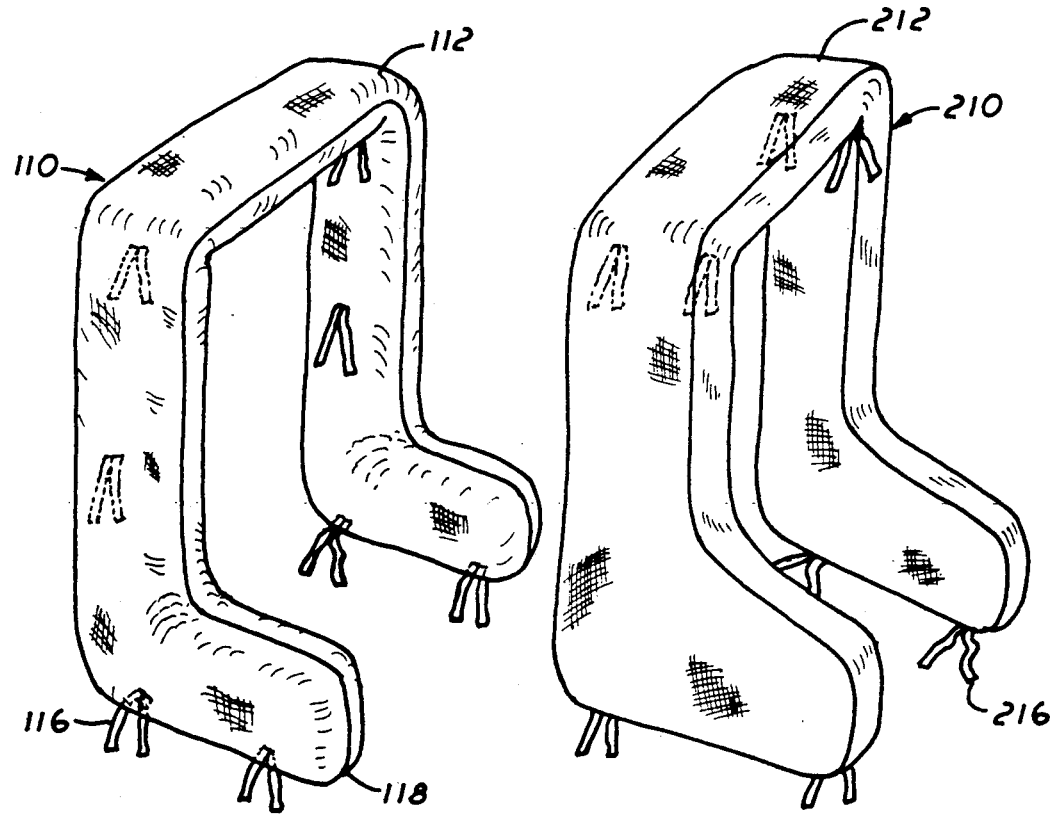
FIG. 7
FIG. 8

PROTECTIVE CUSHION FOR CHILD'S AUTO SEAT

BACKGROUND OF THE INVENTION

1. Field of the Invention

The present invention relates to a protective cushion that is removably attached to a child's auto seat, whereby persons or things seated or placed next to the child's auto seat, whether occupied or not, will be protected from injury or discomfort from the hard, angular, or rough surfaces of the exterior of the auto seat.

2. Description of the Prior Art

It is well known that it is often necessary to provide padding on the surfaces of devices designed for the use of children. The padding is applied to these interior surfaces for the comfort and protection of the children. It is understandable, therefore, that prior art relating to devices for the transportation or containment of children either directly addresses or generally discloses padding placed between the child and such devices, for example, auto seats, cribs and bassinets.

One such invention is a padded car seat disclosed by U.S. Pat. No. 4,754,999, a child's car seat/booster seat where the patent teaches an adjustable car seat that can be used throughout the time period that the child requires such a seat. The patent does not claim the padding, but does disclose padding on the interior portions of the seat and on some areas of the exterior. The main purpose of the padding is to protect the child when he/she is thrown against the interior of the car seat and to provide a comfortable environment within which to sit. A further study of the device discloses knobs, levers and other hard and angular surfaces on the exterior of the seat which are exposed and may cause injury or discomfort to a passenger seated in close proximity.

U.S. Pat. No. 4,583,253 to Hall and U.S. Pat. No. 3,833,947 to Sorensen, both disclose an inflatable crib to be used in an automobile for the transport of an infant or baby. The inflatable exterior walls of the cribs are designed to provide protection to the infant being carried inside the device; however, the inflatable walls do provide protection to occupants of the automobile seated in close proximity. However, it is noted that the inflatable tubular walls are an integral part of the devices and may not be removed for other purposes.

U.S. Pat. No. 4,481,685 to Watson discloses a bassinet restraint system for transporting a bassinet in an automobile. The device consists of a cover which is to be placed over an existing bassinet, and a frame attached to the cover which slides under the bassinet and provides attachment points for the belt system of the automobile. While the padded cover provides protection to other occupants of the automobile from the hard surfaces of the top's frame, it does not prevent contact with other portions of the bassinet or the frame nor is the padding easily removable for other uses.

U.S. Pat. No. 3,018,492 to Rosen teaches a series of inflatable pads to be attached to the interior of infant enclosures, for example, children's cribs, playpens, and carriages. The purpose of the pads is to protect the child from contact with the interior surfaces of those enclosures. There is no suggestion that these pads be placed on the exterior of the crib, nor is there any suggestion that the crib is to be transported in an automobile.

The padding disclosed in the prior art above is present to protect the child; however, there is a need to provide protection for those passengers sitting next to such a child's auto seat. Children's auto seats frequently have hard, angular, sharp or rough surfaces which are not only very uncomfortable to other passengers during normal driving, but may cause serious injury during an accident when passengers are thrown against these surfaces.

SUMMARY OF THE INVENTION

The present invention relates to a protective cushion for a child's auto seat, whereby the passengers in the automobile who are seated adjacent to the child's auto seat are protected from the exterior surfaces of the child's auto seat. The protective cushion comprises a cover, interior padding enclosed by the cover, a plurality of attaching means to attach the cushion to the car seat, and two adjustable ties, or straps, which are used to compress the cushion in strategic areas to provide greater visibility for the driver.

One preferred embodiment may be of tubular construction, where the cushion is generally positioned so that the longitudinal center of the cushion is located at the top center of the back of the child's car seat. The cushion is then draped downwardly along the sides of the car seat and removably attached at various points. The cushion will now be interposed between the sharp and rough edges of the child's auto seat and passengers who are sitting in close proximity to the child's car seat. To attach the cushion to the car seat a plurality of lengths of flexible material are fastened to the cushion at strategic points so that they may be tied around an adjacent tubular frame member. As an alternative, snaps or hook and loop fasteners may be attached to these lengths of flexible material. The use of hook and loop fasteners is particularly useful when the car seat has no accessible parts to which ties may be fastened. Such child's auto seats might be primarily made of hard plastic or have a vinyl covering to which the hook and loop fasteners may be glued or attached by other similar means. At the point where the protective cushion passes over the top of the back of the child's car seat, it may be desirable to reduce the thickness of the protective cushion to improve the driver's visibility when using the rear view mirror or looking backwards over the child's car seat through the rear windows. Straps, either designed for tying, or having snaps or hook and loop fasteners, are attached to the cushion either at the cushion's longitudinal center or, as an alternative, two straps each at a point equidistant from the longitudinal mid point of the cushion. It is preferable that the spacing between these straps be approximately the width of the top of the child's auto seat. By tightening the straps pressure is applied to the cushion padding causing it to be compressed and thus reducing the cushion's cross-section.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be made to the following detailed description taken in connection with accompanying drawings in which:

FIG. 4 is a cross-sectional detail of the protective cushion illustrating one embodiment of the attaching means;

FIG. 5 is a cross-sectional detail of the protective cushion illustrating another embodiment of the attaching means;

FIG. 6 is a cross-sectional detail of the protective cushion illustrating yet another embodiment of the attaching means.

FIG. 7 is a perspective view of another embodiment of the protective pad;

FIG. 8 is a perspective view of a third embodiment of the protective pad.

Similar reference characters refer to similar parts throughout the several views of the drawings.

DETAILED DESCRIPTION

Figure 1:
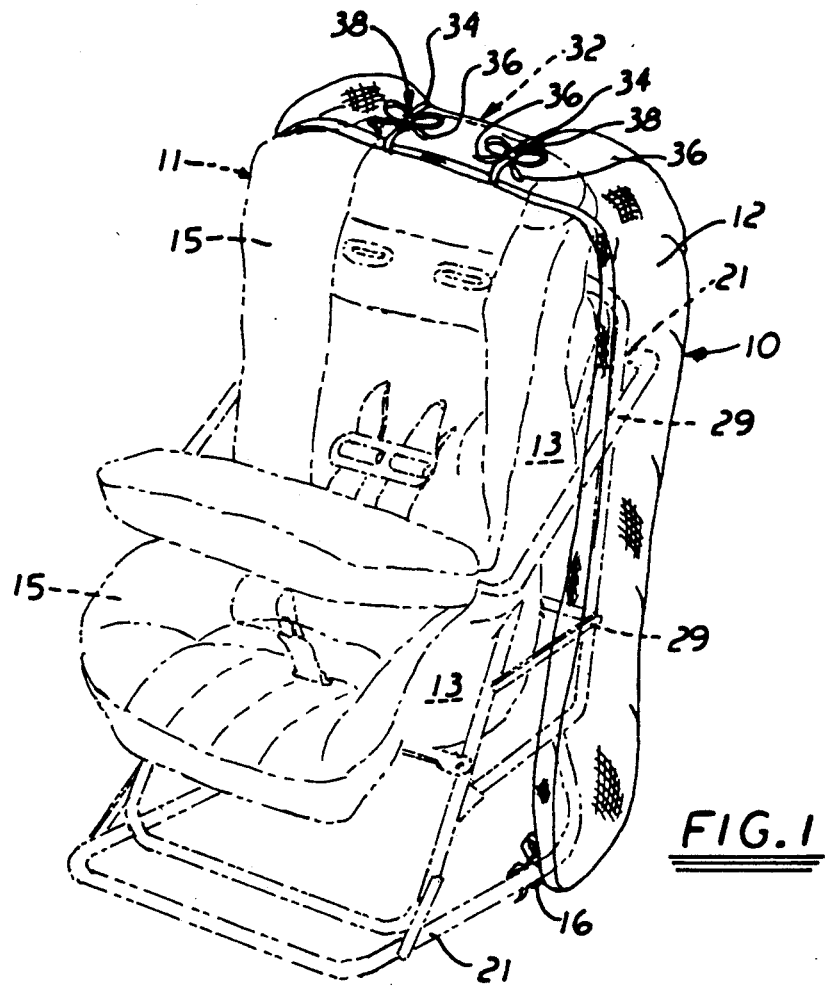
FIG. 1 is a perspective view of one preferred embodiment of the protective cushion for child's auto seat attached to a typical child's auto seat shown in phantom.
Figure 2:
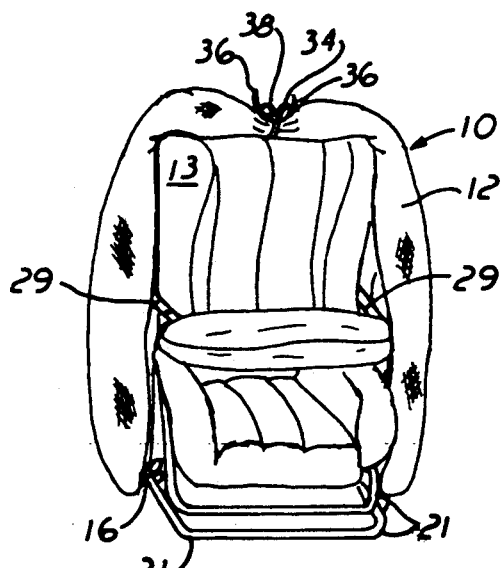
FIG. 2 is a front view of the protective cushion attached to a typical child's auto seat.
Figure 3:
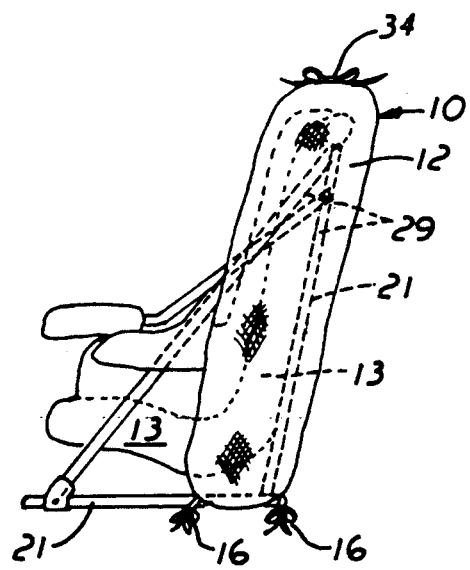
FIG. 3 is a side view of the protective cushion attached to a typical auto seat.

A preferred embodiment for the protective cushion for a child's auto seat is illustrated in drawing FIGS. 1-4. In FIG. 1, the protective cushion, generally indicated as 10, is shown attached to a typical child's auto seat 11, which is illustrated in phantom. Most children's auto seats 11, as shown in FIGS. 1-3, have a seat structure 15 and a supporting frame 21.

In FIG. 4, it can be seen that the protective cushion 10 comprises an exterior cover of flexible material 12 which encloses padding 14 and has a means for removably attaching the protective cushion to the exterior of the child's car seat frame. In this embodiment, the attaching means comprises a plurality of lengths of flexible material, defining ties 16. The material can be any one or any combination of flexible fabrics (for example: cotton, nylon or vinyl). The padding 14, may also be any one or combination of various filling materials (for example: cotton batting, polyester fill, or foam pellets). FIGS. 4, 5 and 6 illustrate a few of the many alternative means for attaching the cushion 10 to auto seat 11. FIG. 4 demonstrates the use of a plurality of lengths of flexible material 16, where one end 17 of each length is attached to the cushion 10, and the opposing ends 19 of each length remain free. Free ends 19 then encircle an adjacent part of the supporting framework 21 of auto seat 11 and are tied together as shown at 16. Alternatively, a single length of material may either be used by passing the single length around a portion of the supporting framework 21 of the child's auto seat 11, and then looping it back and tying it to itself, or by attaching a single length of flexible material to the cushion 10 at other than the end point of the material and then passing the free ends about a portion of the supporting framework 21 of the child's auto seat 11 and tying them together.

FIG. 5 demonstrates a snap attaching means 18 utilizing two separate straps of material 23 and 25, one with a male snap 27 and one with a female snap (not visible) so that they opposingly snap together. However, a single strap could also be used and looped around a part a portion of the supporting framework 21 of the child's auto seat 11 with the male and the female snap parts both being attached to the same strap.

FIG. 6 demonstrates the use of a hook and loop attaching means 20. A patch of hook or loop material 26 is fastened to a part 28 of the car seat 11 by gluing, sewing, or other means. A patch of the opposite hook or loop material 30 is then attached to an adjacent point on the cushion 10 by similar means. The cushion 10 may then be attached to the auto seat part 28 by simply pressing the patches of hook and loop material together as shown at 20. The use of hook and loop fasteners is particularly appropriate for car seats made primarily out of plastic and vinyl materials or where there is no tubular frame to which the ties 16, or snap means 18, can be attached.

FIG. 1 illustrates an embodiment of the protective cushion 10 that may be of tubular construction. The cushion 10, is generally positioned so that the longitudinal center of the cushion is located at the top center of the child's car seat back 32. The protective cushion 10 is then draped downwardly adjacent to a portion of the laterally, outwardly, facing sides 13 of the seat structure 15 of the car seat 11, and adjacent to a portion of the laterally outwardly facing sides 29 of the supporting frame 21 such that at least a portion of any angular, rough, and unpadded surfaces of the seat structure 15 and of the supporting framework 21 of the child's auto seat 11 are encased by the protective cushion 10. The protective cushion 10 is then removably attached at various points.

FIG. 1 and FIG. 2 also illustrate the compressing means. Any number of ties may be used, however FIG. 2 illustrates the use of a single pair of ties 34 attached to the cushion at its longitudinal center. FIG. 1 illustrates the use of two pair of ties 34 attached to the cushion, each at opposing points, generally equidistant from the longitudinal center of the cushion; the preferred total spacing between the ties being generally the width of the child's auto seat 11. The ties are constructed of lengths of flexible material 34, where one end (not visible) of each length is attached to the cushion 10 and the opposing end 36 of each length remains free. The free ends 36 then encircle the cushion and are tied together as shown at 38. By adjusting the tightness with which the ties encircle the cushion, the cushion may be adjustably compressed, permitting improved visibility for the driver when using the rear view mirror or when looking backwards over the child's car seat 11 through the rear windows.

FIG. 7 illustrates an alternative embodiment 110 of the cushion 10 which is very similar to the cushion 10 shown in FIG. 1. In this embodiment 110 similar structural elements have been indicated by numerals in the 100 series. The only change is an increase in the total length of the cushion, enabling end 118 of cushion 10 to extend across the seat of the automobile, providing protective padding to the thighs of a person sitting in close proximity to the child's auto seat.

FIG. 8 illustrates yet another embodiment 210 of the cushion 10 in which the padding is configured to the side profile of a typical car seat providing greater protection to the occupants of the car. In this embodiment 210 similar structural elements have been indicated by numerals in the 200 series.

It will thus be seen that the objects set forth above among those made apparent from the proceeding description are efficiently attained, and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. In combination with a child's auto seat having laterally outwardly facing sides and laterally outwardly facing supporting framework, the sides and framework each having sharp and rough edges, the improvement comprising a removably attachable cushion for attachment to a portion of the sides and the supporting framework, said cushion comprising:
   (a) cover means;
   (b) padding means substantially encased by said cover; and
   (c) attaching means connected to said cushion, said attaching means adapted so that said cushion is removably attached to a portion of the laterally, outwardly facing sides of the seat structure and a portion of the laterally outwardly facing supporting framework of the child's auto seat, such that the padding encases at least a portion of the sharp and rough edges of the child's auto seat, whereby said cushion is interposed between said child's auto seat and persons or things not placed within said child's auto seat.

2. A removably attachable cushion as in claim 1 wherein said attaching means comprises a plurality of lengths of flexible material, each of said lengths being attached at one end thereof to said cushion and opposing ends of said lengths remaining free, whereby said free ends encircle an adjacent part of the auto seat, and may be releasably secured thereto by tying.

3. A removably attachable cushion as in claim 1 wherein said attaching means comprises a plurality of straps, each of said straps being attached at one end thereof to said cushion and opposing ends of said straps remaining free, whereby said free ends encircle an adjacent part of the auto seat, and snap means attached to said straps, whereby said cushion is releasably attached to said child's auto seat.

4. A removably attachable cushion as in claim 1, wherein said attaching means comprises a plurality of straps, each of said straps being attached at one end thereof to said cushion and opposing ends of said straps remaining free, whereby said free ends encircle an adjacent part of the auto seat, and hook and loop fastener means attached to said straps, whereby said cushion is releasably attached to said child's auto seat.

5. A removably attachable cushion as in claim 1, further comprising a compressing means attached to said cushion, whereby said cushion's cross-section is reduced by compressing said cushions's padding means.

6. A removably attachable cushion as in claim 5 wherein said compressing means comprises two lengths of flexible material, each of said lengths being attached at one end thereof to said cushion and opposing ends of said lengths remaining free, such that said free ends opposingly encircle said cushion and are releasably fastened together by tying, and said compressing means is adjusted by changing the tightness with which said lengths of flexible material encircle said cushion.

7. A removably attachable cushion as in claim 1, further comprising a plurality of compressing means attached to said cushion, whereby said cushion's cross-section is reduced by compressing said cushion's padding means.

8. A removably attachable cushion as in claim 7 wherein two said compressing means are attached to said cushion at opposing points, generally equidistant from the longitudinal midpoint of said cushion.

9. A removably attachable cushion as in claim 7 wherein said compressing means comprises two lengths of flexible material, each of said lengths being attached at one end thereof to said cushion and opposing ends of said lengths remaining free, and said free ends opposingly encircle said cushion and are releasably fastened together by tying, whereby the compressing means is adjusted, thereby adjusting the compression of the padding means.

10. A removably attachable cushion as in claim 7, wherein each of said compressing means comprises two straps of flexible material, each of said straps being attached at one end thereof to said cushion and opposing ends of said straps remaining free, and snap means attached to said straps, whereby said free ends of said straps opposingly encircle said cushion and are releasably fastened to each other.

11. A removably attachable cushion as in claim 7, wherein each of said compressing means comprises two straps of flexible material, each of said straps being attached at one end thereof to said cushion and opposing ends of said straps remaining free, and hook and loop fasteners attached to said straps, whereby said free ends of said straps opposingly encircle said cushion and are releasably fastened to each other.

12. In combination with a child's auto seat having laterally outwardly facing sides and laterally outwardly facing supporting framework, each having sharp and rough edges, the improvement comprising a removably attachable cushion for attachment to a portion of the sides and the supporting framework, said cushion comprising:
   (a) cover means;
   (b) padding means substantially encased by said cover; and
   (c) a plurality of lengths of flexible material, each of said lengths being attached at one end thereof to said cushion and opposing ends of said lengths remaining free, such that said free ends encircle an adjacent part of the child's auto set, and are releasably secured thereto by tying, such that said cushion is attached to a portion of the outwardly facing sides of the seat structure and a portion of the laterally outwardly facing supporting framework of the child's auto seat, such that the padding encases at least a portion of the sharp and rough edges of the child's auto seat, whereby said cushion is interposed between said child's auto seat and persons or things not placed within said child's auto seat; and
   (d) a plurality of compressing means each having two ends, one of each of said ends attached to said cushion and the opposing ends remaining free, such that said free ends encircle said cushion and are releasably fastened by tying such that said compressing means is adjusted by changing the tightness with which said lengths of flexible material encircle said cushion.

* * * * *